United States Patent

Sion

[11] 3,902,108
[45] Aug. 26, 1975

[54] VOLTAGE MULTIPLIER

[76] Inventor: Daniel Sion, 19 Ave. Dubonnet, 92401-Courbevoie, France

[22] Filed: Jan. 30, 1974

[21] Appl. No.: 437,797

[30] Foreign Application Priority Data
  Feb. 1, 1973 France .............................. 73.04029
  Feb. 27, 1973 France .............................. 73.07427

[52] U.S. Cl. ................................................ 321/15
[51] Int. Cl.² ............................................ H02M 7/00
[58] Field of Search ....................................... 321/15

[56] References Cited
UNITED STATES PATENTS

| | | | |
|---|---|---|---|
| 3,589,003 | 6/1971 | Kastner | 321/15 UX |
| 3,599,038 | 8/1971 | Skidmore | 321/15 X |
| 3,714,530 | 1/1973 | Wells et al. | 321/15 X |
| 3,723,846 | 3/1973 | Thompson, Jr. | 321/15 |
| 3,731,145 | 5/1973 | Senay | 321/15 X |

*Primary Examiner*—R. N. Envall, Jr.
*Attorney, Agent, or Firm*—Lee C. Robinson, Jr.

[57] ABSTRACT

A multi-stage cascade voltage-multiplier device which includes electric condensers and diodes of the composite type comprising an assembly of elementary diodes. Each of the composite diodes is disposed between two conductive surfaces and is oriented substantially perpendicular to the surfaces at an adequate distance therefrom such that all of the elementary diodes are subjected to substantially the same instantaneous reverse voltage and undue breakdown of the diodes is prevented. In some embodiments the voltage-multiplier device is of the parallel-series type and is associated with a direct-current high-tension generator with at least the multiplier device incorporated in the barrel of an electrostatic projection gun.

10 Claims, 9 Drawing Figures

VOLTAGE MULTIPLIER

BACKGROUND OF THE INVENTION

The present invention relates to multi-stage cascade voltage-multiplying devices and more particularly to such devices for use with direct-current high-tension generators.

Voltage multipliers of this kind commonly include a succession of rectifier stages, with diodes and condensers, and are either of the series type, following the conventional Greinacher connection, the parallel type, or the hybrid type, these different kinds of known connections being described for example on page 1,081 of the Dutch Review "Bedrijf en Techniek" of June 10, 1971.

A series connection is characterized by the fact that each of the capacities relative to a stage of order N is referenced with respect to the capacitance of the stage of order $(N - 1)$; a parallel connection is characterized by the fact that the capacities of each of the stages are referenced in turn with respect to one and the other of the alternating input terminals of the cascade multiplier; and a hybrid connection is characterized by the fact that the capacities of each stage are each referenced with respect to a selected capacitance of a preceding stage.

In situations in which it is desired to obtain a very high output voltage, for example of the order ot 60 to 80 kV, as is the case for high-tension generators intended to supply such equipment as electrostatic painting or powdering guns, the diodes of the device should be capable of withstanding the instantaneous reverse voltage utilized. Such diodes frequently comprise a compact assembly having a series of elementary diodes, the number of which may be as high as several hundred.

Heretofore, the connection in series of these elementary diodes has exhibited a serious drawback. If in theory each of the elementary diodes must withstand an instantaneous reverse voltage equal to a value inversely proportional to the number of diodes of the total instantaneous reverse voltage, in reality this is unfortunately not always the case. For example, if all the elementary diodes in series are distributed over an equipotential surface, only the first and last of the elementary diodes will have an instantaneous inverse potential difference at their terminals, the instantaneous reverse voltage will be divided only between these two elementary diodes, and they will therefore be subjected to a reverse voltage very much greater than that which they can withstand.

It has therefore been frequently found that the diodes employed in prior voltage multiplier circuits for apparatus supplying high voltages had a very short life.

SUMMARY

The method of construction of voltage multipliers according to the invention enables this drawback to be overcome. By this means, in fact, each elementary diode forming part of a combined diode is subjected to an instantaneous reverse voltage which is approximately the same. The arrangement is such that the various diodes in the cascade are prevented from becoming damaged after a short working life.

In several important embodiments of the invention, each of the combination diodes forming the cascade is arranged between two comparatively large conductive surfaces. The diodes are located sufficiently from these surfaces, and in a manner either perpendicular or slightly oblique with respect to the surfaces, that the instantaneous electric field along the diode is approximately constant. There is thus obtained an instantaneous potential difference which varies uniformly along the combination diode, and in consequence a potential difference at the terminals of each of the elementary diodes, which is substantially identical for each elementary diode at every instant.

Certain advantageous embodiments of the invention utilize cascade voltage multipliers in a novel design for electrostatic projectors, such as projectors for liquid, powder or fibers. The projectors are of the type in which the cascade voltage multiplier is associated with a hightension generator for supplying the charge electrode of the projector and is incorporated in the gun portion of the projector.

Electrostatic projectors, such as for example fixed or manual guns for electrostatic painting, powdering or flocking, generally employ a separate high-tension generator connected to the projector by a high-tension cable. a high-tension voltage is delivered to the projector and can vary within the range of between about 30 and 150 kV. In order to connect the generator to the gun, it has heretofore been necessary to utilize comparatively heavy, bulky and relatively rigid cables, with the result that the handling properties of the gun were adversely affected to a substantial degree.

These difficulties were of particular moment for manual electrostatic projection guns. In an attempt to resolve the problem, it has been proposed, in accordance with published German Patent Application No. 1,039,894 and French Pat. No. 2,051,226, to incorporate all or part of the high-tension generator in the gun itself.

An electronic high-tension generator for an electrostatic spraying gun, for example, generally comprises a DC-AC converter having at its output an alternating voltage of a value of a few multiples of 10 volts and a frequency of several multiples of 10 kilohertz. This DC-AC converter is followed by a voltage step-up transformer which produces an alternating voltage of a few kV, supplying in turn a conventional cascade multiplier comprising diodes and condensers.

The early attempts to incorporate at least part of the high-tension generator in the electrostatic projection gun commonly included the location of a cascade multiplier of the series or Greinacher connection type in the barrel of the gun. The utilization of such a series type cascade, however, often resulted in considerable production difficulties. As an illustration, the capacitances necessitated by this type of cascade are of relatively high value, going from a few multiples of ten to several hundred pF. To achieve these high capacitances by the convenient technique of metallizing the faces of a printed circuit plate, the dimensions of the plate would be too large to be capable of incorporation in the barrel of the gun. In consequence, it was heretofore necessary to use commercially available condensers in the cascade circuit. The mounting of such a cascade having sufficiently small dimensions for it to be incorporated in the barrel of a gun is very awkward, however, and therefore the production cost is high.

In addition, the unit capacities of the cascade Greinacher connection commonly are of the order of about 50 pF, and it is difficult or even impossible at the present time to find available in commerce condensers having such a low value which at the same time exhibit a sufficiently high breakdown voltage. Accordingly, the circuits often were designed with capacitances having a value of the order of 10 times that which was actually needed.

Now, as is well known in the technique of electrostatic projection, if the accumulated energy is sufficiently high it can give rise to a dangerous spark which may result in a fire or explosion in the projection cabin. With such unnecessarily high capacitances, this risk of fire or explosion became needlessly increased.

It was therefore proposed to utilize another type of cascade device, known in the art as a "parallel cascade multiplier" or "parallel adding device." In this latter type of cascade, the capacitance of each of the stages is no longer referenced with respect to the corresponding capacitance of the preceding stage, as is the case in a series adding device, but is referenced with respect to one of the two input terminals of the cascade device. A parallel adding device of this known type is shown diagrammatically, for example, in FIG. 6a, page 1,081, of the Dutch Review "Bedrijf en Techniek" referred to above.

The capacitances necessary for a parallel cascade device are definitely smaller than those required for a series cascade device of equivalent performance characteristics. For example, it has been calculated that for a Greinacher cascade with six stages having a unit capacitance of 50 pF, the theoretical unit capacitance of the corresponding parallel connection was only 3.6 pF. The actual unit capacitance utilized for the construction of the circuit will obviously be greater than 3.6 pF because of the stray capacitances, but in practice it will remain very low.

These low unit capacitances are produced by metallization of the faces of a plate for a printed circuit, in a particularly simple form, since the capacitances of the fixed column and also those of the oscillating column are all referenced respectively to the same point. The diodes also may be easily arranged in the manner previously described, which ensures that they have a long life.

The utilization of parallel adding devices for incorporation in the barrel of an electrostatic projection gun is not, however, free from certain disadvantages. The printed circuit plates readily available commercially have a thickness defined by a standard (e.g., 1.6 mm.) and are not readily able to withstand excessive voltages. It is generally accepted that the maximum voltage which can be withstood by a plate of this thickness is of the order of about 40 kV. Now, in the case of most guns it is desired to have a voltage of the order of 60 to 80 kV for manual guns and a voltage of the order of 100 to 150 kV for guns provided on automatic installations.

In a parallel adding device, each of the condensers is subjected at its terminals to the total voltage of the corresponding stage, so that, by the use of a standard printed circuit plate with a thickness of 1.6 mm., voltages greater than about 40 kV should not be used. This may be alleviated, to some extent, by employing a printed circuit plate having a thickness which increases with the stages, but the resulting structure is unnecessarily complicated and production costs are increased.

Another possible solution is the use of a printed circuit plate of constant thickness but over-dimensioned. Here again, however, the arrangement is not ideal, among other reasons because it increased the weight of the cascade device and also its dimensions. Furthermore, the energy accumulated in the last condensers of the device is comparatively high because of the high mean voltage at the terminals. It has been calculated that the accumulated energy in a parallel cascade of $n$ stages was of the same order of magnitude as that accumulated in a Greinacher cascade of $n$ stages, the increase in voltage at the terminals of the condensers in the parallel cascade compensating approximately for the reduction in the value of the condensers as compared with those in the Greinacher cascade. There is thus little progress with respect to a reduction of the discharge energy in the event of a spark, when passing from the optimum Greinacher cascade to the parallel cascade.

The electrostatic projector with a cascade incorporated in the barrel according to a preferred embodiment of the invention does not possess the disadvantages of the electrostatic projectors with built-in cascades referred to above. In fact, the invention makes it possible to produce the capacitors of the cascade on a printed circuit of small thickness, this thickness being constant, with the result that there is a very substantial reduction in the discharge energy of the cascade in the event of a spark.

In accordance with certain advantageous embodiments of the invention, a form of cascade of the hybrid type, that is to say parallel-series cascade, is built into the barrel of the electrostatic projection gun.

Examples of hybrid cascades of this type are shown diagrammatically in FIG. 7 on page 1,081 of the Dutch Review "Bedrijf en Techniek" referred to above.

The invention will be more clearly understood by means of the description which follows below relating to a few examples of construction, reference being made to the accompanying drawings.

DESCRIPTION OF CERTAIN PREFERRED EMBODIMENTS

Figure 1:
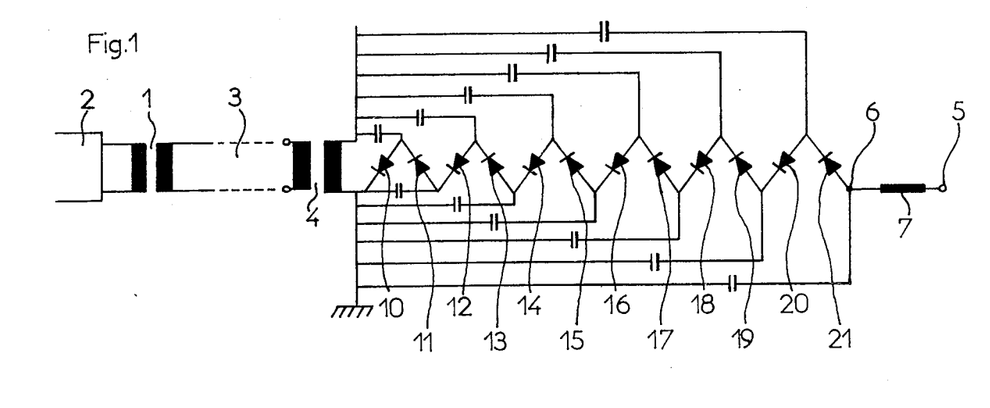
FIGS. 1 and 2 show respectively an electric diagram and an assembly diagram according to an illustrative embodiment of the invention, depicting a cascade of the parallel type intended to be employed for the supply of high-tension current to an electrostatic painting, powdering or flocking gun, the cascade being miniaturized in such manner that it can easily be incorporated in the barrel of the gun.

In FIG. 1 the reference 1 indicates the output transformer of a DC-AC converter 2 operating at an illustrative frequency of 30 kHz. A voltage of about 20 volts is taken from the secondary of the transformer 1 and is delivered by means of a cable 3 to a transformer 4. The transformer 4 is located in the body of an electrostatic projection gun and supplies an output voltage of about 5 kV at its secondary.

A parallel cascade is provided at the terminals of the transformer 4. The cascade comprises six stages and provides at its output 5 a direct current high-tension voltage having a value sufficient to supply the charging electrode of the electrostatic spraying gun. The output 5 is connected to the point of highest voltage 6 of the cascade through the intermediary of a resistance 7 having a value of a few megohms, for example 10 megohms, serving to protect the generator for the gun.

Figure 2:
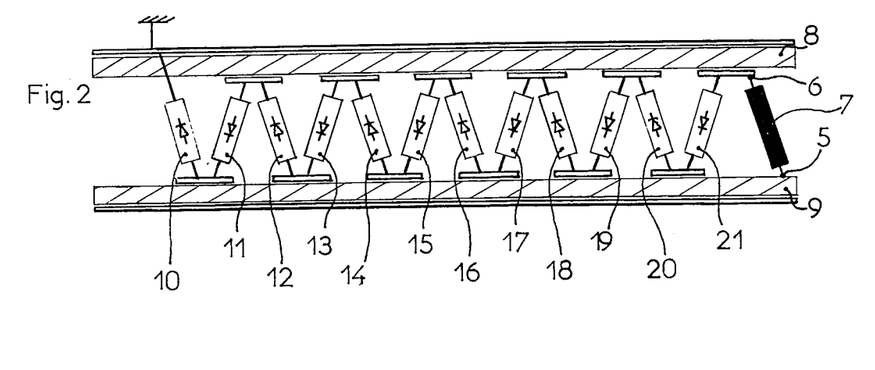

FIG. 2 shows a form of construction of the cascade of FIG. 1. Each of the capacitors in the cascade is produced by metallization of each of the faces of a pair of flat insulaing plates 8 and 9. These plates are similar to the plates used for printed circuits, and each plate illustratively is formed from a sheet of epoxy resin having a thickness of 2.6 mm., a length of 14 cm., and a width of about 4 cm.

Electrically connected between the plates 8 and 9 are a series of combination diodes 10 – 21. With the object of preventing the elementary diodes which constitute each of the combination diodes 10 – 21 from being subjected to reverse voltages which are not substantially identical in instantaneous value, the plates 8 and 9 are placed one above the other in parallel planes. The combination diodes 10 – 21 are placed to provide current flow in a direction perpendicular or slightly oblique with reference to these planes, so that each of the diodes is located in a zone in which the instantaneous electric field is approximately constant. For that purpose, the diodes also are positioned in spaced relationship with the edges of the metallized plates. The position of each diode with respect to the edges of the plates is particularly important in the production of a cascade multiplier according to the invention.

A convenient numerical estimation of the positions to be adopted for these diodes may be obtained by considering the minimum distance in a plane orthogonal to the diodes from the outer surface of each diode to the edge of the adjacent plate and then estimating the ratio R between this minimum distance and the mean distance between the plates.

For a ratio R greater than or equal to 1, the effect desired by the present invention is particularly well obtained. The effect is less pronounced as the ratio R diminishes. It is still fairly satisfactory in the vicinity of a ratio R equal to 0.5, but it is nonexistant for a ratio R of zero or of the order of 0.1 to 0.2. In the assembly shown diagrammatically in FIG. 2, the distance between the plates 8 and 9 is of the same order of magnitude as the length of the combination diodes, namely about 2 cm.

Although the facing surfaces of the plates 8 and 9 are flat, it is apparent that they may have substantially any other shape, such as incurved shape, without departing from the scope of the invention, provided that the position and the general direction of each of the combination or compound diodes correspond to a position and a direction in which the instantaneous electric field is approximately constant.

Figure 3A:
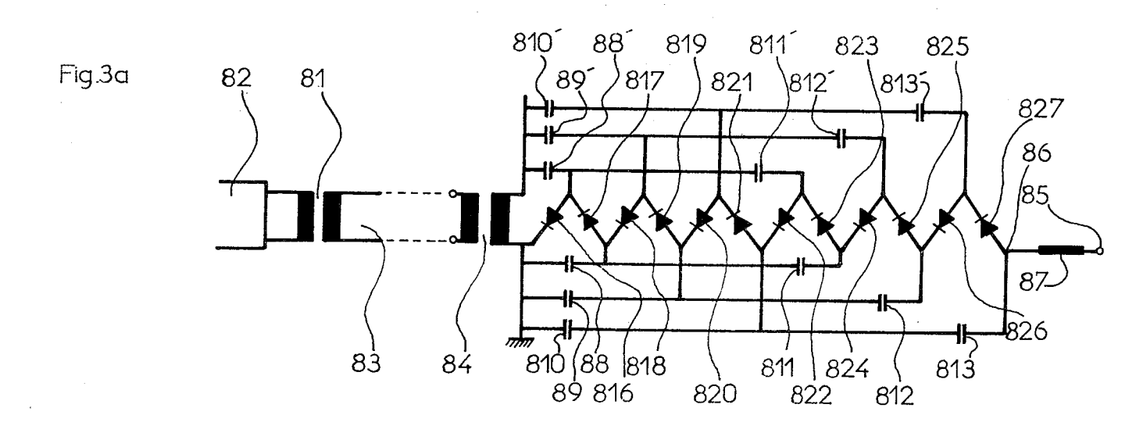
FIGS. 3a and 3b represent respectively an electrical diagram and an assembly diagram according to another illustrative embodiment of the invention, depicting a cascade of the hybrid type intended to be built in to an electrostatic projection gun.

In FIG. 3a the reference 81 indicates the output transformer of a DC-AC converter 82 operating at an illustrative frequency of about 30 kHz. A voltage of about 20 volts is collected from the secondary of the transformer 81 and is delivered by a flexible lightweight cable 83 to a small transformer 84. The transformer 84 is located in the body of the gun and delivers to its secondary an output voltage of about 5 kV and a frequency of about 30 kHz.

A cascade of the hybrid or parallel-series type is connected across the terminals of the secondary of the transformer 84. This cascade includes six stages and provides at its output terminal 85 a direct-current high-tension voltage, illustratively about 60 kV, which is sufficient to supply the high-tension electrode of the electrostatic projection gun.

The output terminal 85 is connected to the point 86 of the highest voltage of the cascade through the intermediary of a resistor 87. The resistance of the resistor 87 is of the order of a few megohms and serves to protect the generator.

The circuit design of the hybrid cascade according to FIG. 3a is such that none of the condensers in the cascade is subjected to a voltage exceeding about 30 kV. It will be understood that a hybrid cascade is characterized by the fact that the capacitances of each stage are referenced with respect to a capacitance chosen from the same column but in a preceding stage.

In order that the voltage be maintained below about 30kV, and taking account of the fact that the alternating voltage delivered to the secondary of the transformer 84 has an amplitude of 5 kV, the assembly is made in the following manner: the condensers 88, 88', 89. 89', 810 and 810' of the first three stages of the cascade are referenced with respect to the input terminals of the cascade, that is, with respect to the output terminals of the secondary of the transformer 84. The condensers 811 and 811' of the fourth stage are referenced with respect to the corresponding condensers 88 and 88' of the first stage so that they only need to withstand a maximum voltage of 30 kV. Similarly, the condensers 812 and 812' of the fifth stage are referenced with respect to the corresponding condensers 89 and 89' of the second stage and the condensers 813 and 813' of the third stage. It can be seen generally that in this type of connection the condensers of order higher than the third stage are referenced with respect to the corresponding condensers of the stage having an order three times before.

Figure 3B:
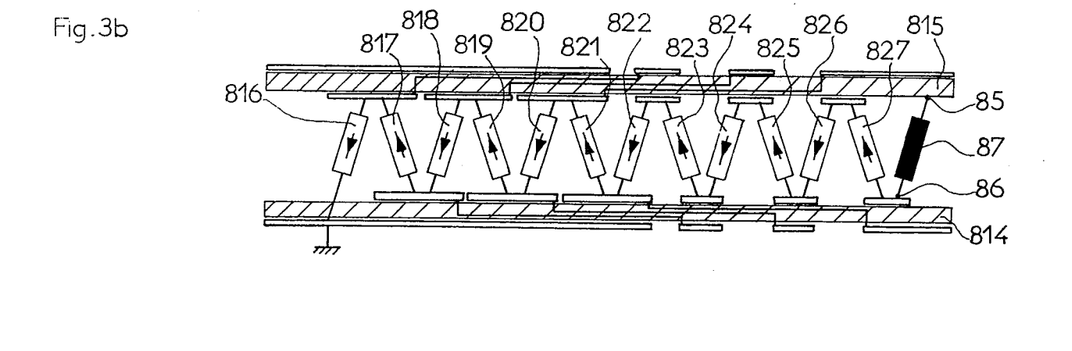

FIG. 3b shows diagrammatically a form of construction of the cascade according to FIG. 3a. The two parallel plates employed, 814 and 815, have a standard thickness of 1.6 mm. Each of the diodes 816 – 827 is placed between the two plates 814 and 815 in such manner that the electric field along each diode is substantially constant.

Figure 4A:
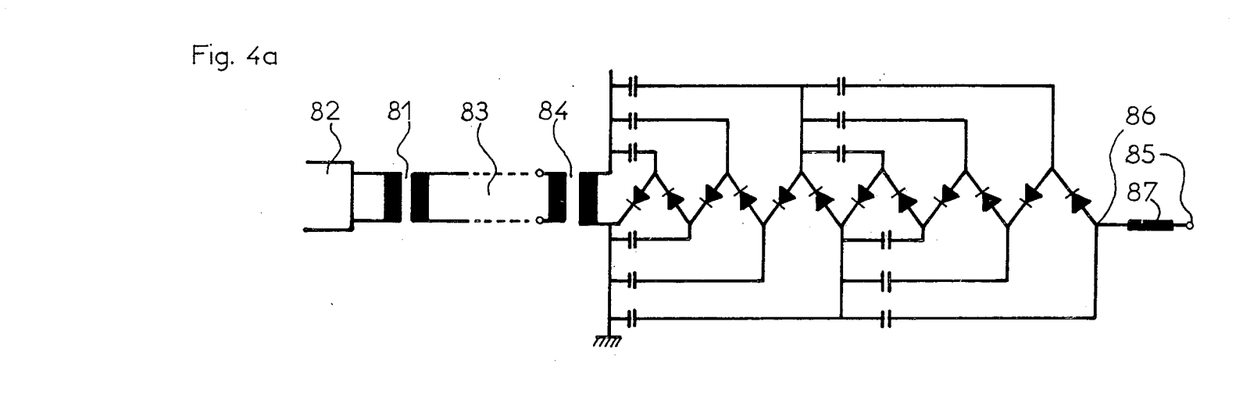
FIGS. 4a and 4b represent respectively an electrical diagram and an assembly diagram of still another type of hybrid cascade intended to be incorporated in an electrostatic projection gun in accordance with a further illustrative embodiment of the invention.
Figure 4B:
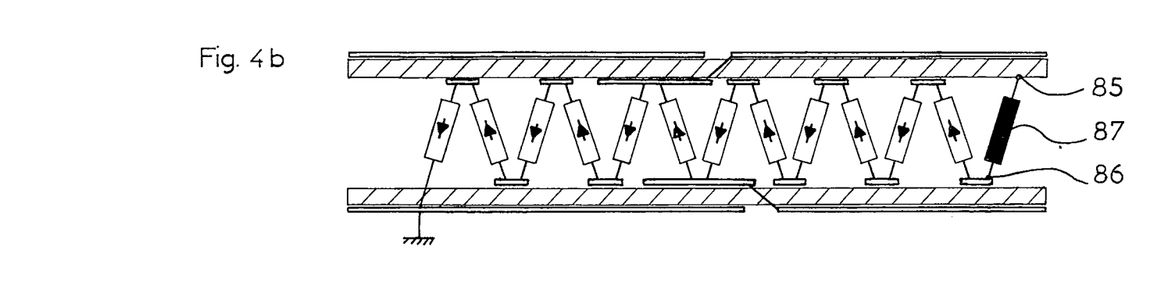

FIGS. 4a and 4b represent another form of hybrid cascade intended to be incorporated in an electrostatic projection gun. According to this latter model of hybrid cascade, as can be seen from the electrical diagram of FIG. 4a, the condensers of the first three stages are referenced with respect to the two input terminals of the cascade and the condensers of the last three stages are referenced with respect to the corresponding condensers of the third stage. This type of hybrid cascade permits a more convenient application, the connections being simpler to effect.

Cascades of the hybrid type utilize, for some of their condensers, capacitances having a value greater than those employed in cascades of the parallel type. If the hybrid cascade shown in FIGS. 4a and 4b is considered with respect to the parallel cascade of FIGS. 1 and 2, for example, there is a difference in the value of the two capacitances which equip the third stage of the cascade. In the case of the hybrid cascade these capacitances are four times higher than that of the capacitances of the other stages, and the latter capacitances have approximately the same value, for the same performance characteristics, as those in parallel cascade.

The increase in value of the capacitances in the hybrid cascade does not however lead to a substantial increase in the dimensions of the cascade as compared with the parallel cascade, since, as the thickness of the dielectric is smaller, the dimensions of the plates of the various condensers are also smaller for the same capacitance value.

For the hybrid cascade, there is obtained a reduction of energy accumulated by the cascade and liberated in the event of a spark. This liberated energy is about 40% of the corresponding energy of the parallel cascade. The hybrid cascade is thus more favorable from the point of view of safety in the supply of high-tension to electrostatic projection apparatus.

Figure 5:
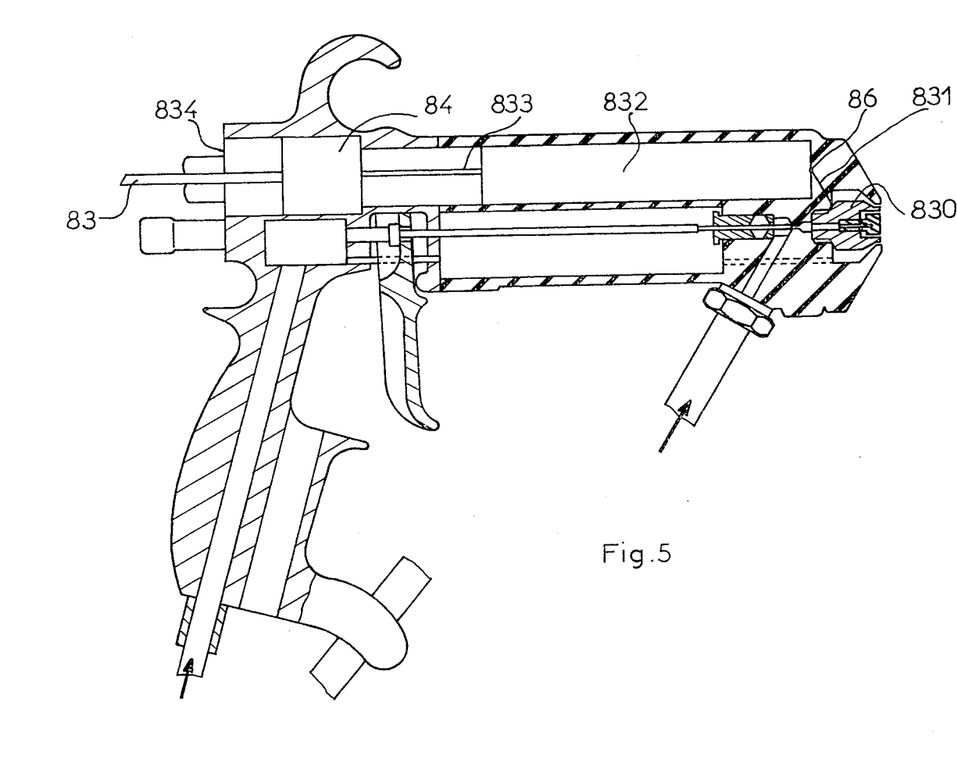
FIG. 5 shows diagrammatically a manual electrostatic painting gun incorporating a hybrid cascade of the type illustrated in FIGS. 3a and 3b.

The electrostatic painting gun of FIG. 5 includes a metallic charge electrode 830. The electrode 830 is connected by a very short metallic conductor 831 to the output terminal 86 of a cascade voltage multiplier 832 of the hybrid type. This multiplier is in the form of a removable cartridge mounted in the barrel of the gun and is of the form illustrated in FIGS. 3a and 3b.

The transformer 84 of FIG. 3a is also placed in the body of the gun and is coupled to the cascade 832 by a connection 833. The alternating voltage issuing from the DC-AC converter is led to the transformer 84 by the electric cable 83, this cable being of small diameter as it only needs to carry a voltage of low value. A rear opening 834 within the gun enables the ready removal of the transformer and the cascade for repair or replacement.

Figure 6:
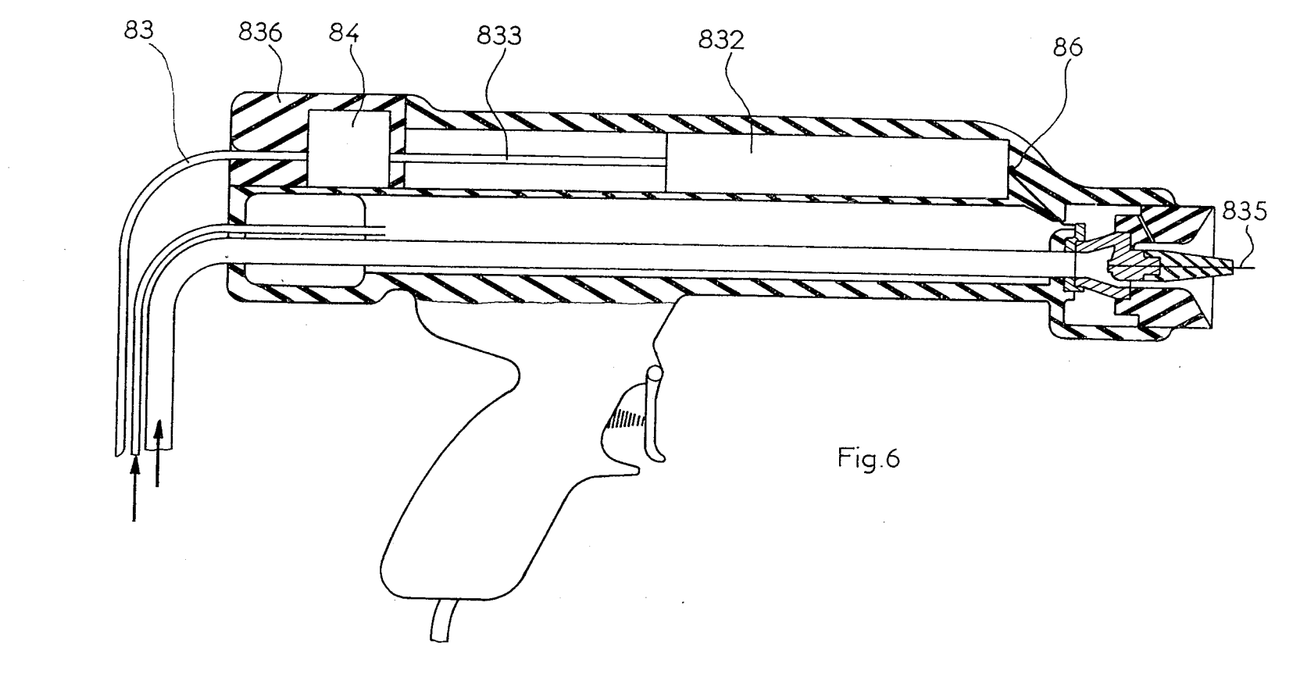
FIG. 6 shows diagrammatically a manual electrostatic powdering gun incorporating a hybrid cascade of the type illustrated in FIGS. 3a and 3b.

FIG. 6 is illustrative of a generally conventional electrostatic powdering gun which has been modified in accordance with the invention. The gun is of the manual type and includes a charge electrode 835 connected by a short conductor to the output terminal 86 of the hybrid cascade multiplier 832. The multiplier 832 in turn is coupled by the cable 833 to the transformer 84 supplied by the cable 83. A removable rear portion 836 of the powdering gun contains the transformer 85 and permits the easy withdrawal of the transformer, the cable 833 and the cascade 832.

Figure 7:
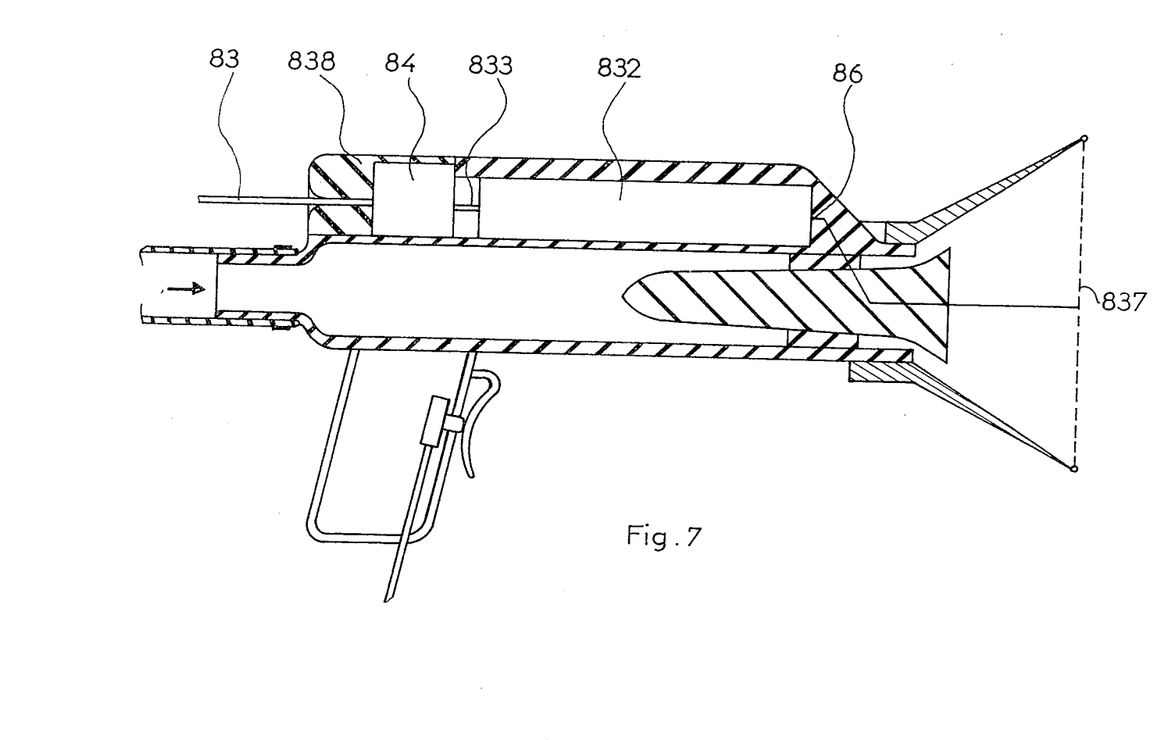
FIG. 7 shows diagrammatically a manual electrostatic flocking gun incorporating a hybrid cascade of the type illustrated in FIGS. 3a and 3b.

The manual electrostatic flocking gun of FIG. 7 is provided with a charge grid 837 for the fibres to be projected. The grid 837 is joined by a short connection to the output of the hybrid cascade 832, and the cascade in turn is coupled by the cable 833 to the transformer 84. The transformer 84 is connected to the output of a conventional thyratron inverter (not shown) by the cable 83. In a manner similar to that described above in connection with the powder gun of FIG. 6, a removable rear portion 838 which permits the extraction of the transformer 84, the cable 833 and the cascade 832.

The invention may be applied to all types of cascade voltage multipliers utilized in direct current high-tension generators, and also to all types of electro-static projectors having a cascade voltage multiplier built into the barrel. It finds an especially advantageous application for manual electrostatic projection guns for spraying coating products.

The terms and expressions which have been employed are terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A cascade voltage multiplier device comprising, in combination:
   a pair of electrically conductive surfaces in spaced apart relationship with each other;
   a series of combination diodes interposed between the surfaces in electrically conductive relationship therewith, each of the combination diodes comprising a plurality of elementary diodes and being oriented to pass current in a direction substantially perpendicular to at least one of the surfaces; and
   means for applying a voltage across the surfaces, each of the combination diodes being spaced from the surfaces by a distance sufficient to prevent undue breakdown of the elementary diodes and to subject the elementary diodes to substantially the same instantaneous reverse voltage.

2. A cascade voltage multiplier device as defined in claim 1, in which the electrically conductive surfaces extend in flat substantially parallel planes.

3. A cascade voltage multiplier device comprising, in combination:
   a pair of electrically conductive surfaces in spaced apart parallel relationship with each other;
   a series of elongate combination diodes interposed between the surfaces in electrically conductive relationship therewith, each of the combination diodes comprising a plurality of elementary diodes and being physically oriented such that each combination diode extends in a direction substantially perpendicular to the surfaces, the elementary diodes and the surfaces being connected to provide a cascade multiplier of the parallel type; and
   means for applying a voltage across the surfaces, each of the combination diodes being spaced from the surfaces by a distance sufficient to prevent undue breakdown of the elementary diodes and to subject the elementary diodes to substantially the same instantaneous reverse voltage.

4. A cascade voltage multiplier device comprising, in combination:
   a pair of electrically conductive surfaces in spaced apart parallel relationship with each other;
   a series of elongate combination diodes interposed between the surfaces in electrically conductive relationship therewith, each of the combination diodes comprising a plurality of elementary diodes and being physically oriented such that each combination diode extends in a direction substantially perpendicular to the surfaces, the elementary diodes and the surfaces being connected to provide a cascade multiplier of the parallel-series type; and means for applying a voltage across the surfaces, each of the combination diodes being spaced from the surfaces by a distance sufficient to prevent undue breakdown of the elementary diodes and to subject the elementary diodes to substantially the same instantaneous reverse voltage.

5. A cascade voltage multiplier device as defined in claim 4, in which each of the combination diodes is substantially perpendicular to the electrically conductive surfaces but is oriented at a slight angle with respect thereto.

6. A cascade voltage multiplier device for the barrel of an electrostatic coating projector, the device comprising, in combination:

a pair of electrically conductive surfaces in spaced apart relationship with each other;

a series of combination diodes interposed between the surfaces in electrically conductive relationship therewith, each of the combination diodes comprising a plurality of elementary diodes and being oriented to pass current in a direction substantially perpendicular to the surfaces;

means for applying a voltage across the surfaces, each of the combination diodes being spaced from the surfaces by a distance sufficient to prevent undue breakdown of the elementary diodes and to subject the elementary diodes to substantially the same instantaneous reverse voltage; and mounting means for supporting the surfaces and the combination diodes on the barrel of the electrostatic projector.

7. A cascade voltage multiplier device for the barrel of an electrostatic coating projector, the device comprising, in combination:

a pair of electrically conductive surfaces in spaced apart parallel relationship with each other, a series of elongate combination diodes interposed between the surfaces in electrically conductive relationship therewith, each of the combination diodes comprising a plurality of elementary diodes and being physically oriented such that each combination diode extends in a direction substantially perpendicular to the surfaces, the elementary diodes and the surfaces being connected to provide a cascade multiplier of the parallel-series type;

means for applying a voltage across the surfaces, each of the combination diodes being spaced from the surfaces by a distance sufficient to prevent undue breakdown of the elementary diodes and to subject the elementary diodes to substantially the same instantaneous reverse voltage; and mounting means for supporting the cascade multiplier on the barrel of the electrostatic projector.

8. A device as defined in claim 7, in which the cascade multiplier is removably supported within the barrel of the electrostatic projector.

9. In an electrostatic coating projection gun having a barrel portion, in combination:

a pair of spaced electrically conductive surfaces;

a series of combination diodes interposed between the surfaces in electrically conductive relationship therewith, each of the combination diodes comprising a plurality of elementary diodes and being oriented to pass current in a direction substantially perpendicular to the surfaces, the elementary diodes and the surfaces being connected to provide a cascade multiplier of the parallel-series type;

high-tension generator means for applying a voltage across the surfaces, each of the combination diodes being spaced from the surfaces by a distance sufficient to prevent undue breakdown of the elementary diodes and to subject the elementary diodes to substantially the same instantaneous reverse voltage; and mounting means for supporting the cascade multiplier on the barrel portion of the gun.

10. In an electrostatic projection gun as defined in claim 9, the gun comprising a manual electrostatic projector.

* * * * *